United States Patent
Glatz et al.

(10) Patent No.: US 7,390,456 B2
(45) Date of Patent: Jun. 24, 2008

(54) POWDER-METALLURGIC METHOD FOR PRODUCING HIGHLY DENSE SHAPED PARTS

(75) Inventors: Wolfgang Glatz, Reutte/Tirol (AT); Martin Janousek, Reutte/Tirol (AT); Wolfgang Kraussler, Weissenbach/Tirol (AT); Gebhard Zobl, Schattwald/Tirol (AT); Reinhold Zach, Reutte/Tirol (AT)

(73) Assignee: Plansee Aktiengesellschaft, Reutte/Tirol (AT)

( * ) Notice: Subject to any disclaimer, the term of this patent is extended or adjusted under 35 U.S.C. 154(b) by 0 days.

(21) Appl. No.: 10/238,938

(22) Filed: Sep. 10, 2002

(65) Prior Publication Data

US 2003/0021715 A1 Jan. 30, 2003

Related U.S. Application Data

(63) Continuation of application No. PCT/AT01/00398, filed on Dec. 19, 2001.

(30) Foreign Application Priority Data

Jan. 15, 2001 (AT) ............................. GM 31/2001

(51) Int. Cl.
*B22F 3/12* (2006.01)
(52) U.S. Cl. ...................... 419/29; 419/19; 429/210; 429/34; 420/34; 420/428
(58) Field of Classification Search ................ 420/40; 419/32, 38, 30, 34, 46, 29
See application file for complete search history.

(56) References Cited

U.S. PATENT DOCUMENTS

| | | | | |
|---|---|---|---|---|
| 2,827,407 | A * | 3/1958 | Carlson et al. ............... 75/246 |
| 3,024,110 | A * | 3/1962 | Funkhouser et al. .......... 419/19 |
| 3,085,876 | A * | 4/1963 | Alexander et al. ............ 419/19 |
| 3,150,443 | A * | 9/1964 | Alexander et al. ............ 75/232 |
| 3,179,515 | A * | 4/1965 | Grant et al. .................. 108/90 |
| 3,180,727 | A * | 4/1965 | Alexander et al. .......... 148/401 |
| 3,382,051 | A * | 5/1968 | Barnett ........................ 75/235 |
| 3,556,769 | A * | 1/1971 | Lambert et al. ............... 75/252 |
| 3,660,049 | A * | 5/1972 | Benjamin ..................... 75/235 |
| 3,696,486 | A * | 10/1972 | Benjamin .................. 29/182.5 |
| 3,723,109 | A * | 3/1973 | Lacock et al. ................. 419/48 |
| 3,778,249 | A * | 12/1973 | Benjamin ..................... 75/232 |
| 3,785,801 | A * | 1/1974 | Benjamin ................. 75/0.5 BC |
| 3,837,930 | A * | 9/1974 | Cairns et al. .................. 419/13 |
| 3,841,847 | A * | 10/1974 | Jones et al. .................. 420/428 |
| 3,970,445 | A * | 7/1976 | Gale et al. ..................... 420/64 |
| 3,975,193 | A * | 8/1976 | Nayar .......................... 419/31 |
| 3,992,161 | A * | 11/1976 | Cairns et al. ............... 29/182.5 |
| 4,000,983 | A * | 1/1977 | Alexandrov et al. .......... 75/234 |
| 4,071,354 | A * | 1/1978 | Mocarski .................... 75/0.5 R |
| 4,239,557 | A * | 12/1980 | Thellmann et al. ............. 419/2 |
| 4,240,831 | A * | 12/1980 | Ro et al. ....................... 75/228 |
| 4,382,818 | A * | 5/1983 | Mocarski ..................... 419/11 |
| 4,518,427 | A * | 5/1985 | Tengzelius et al. ............ 75/255 |
| 4,732,622 | A * | 3/1988 | Jones ........................... 419/38 |
| 4,985,309 | A * | 1/1991 | Ogura et al. ................. 428/570 |
| 5,069,867 | A * | 12/1991 | Zengin ........................ 419/15 |
| 5,298,055 | A * | 3/1994 | Semel et al. .................. 75/252 |
| 5,356,453 | A * | 10/1994 | Takata ......................... 75/244 |
| 5,407,758 | A | 4/1995 | Greiner et al. |
| 5,427,601 | A * | 6/1995 | Harada et al. ................. 75/235 |
| 5,608,174 | A * | 3/1997 | Eck et al. ...................... 75/235 |
| 5,641,920 | A * | 6/1997 | Hens et al. .................... 75/228 |
| 5,733,682 | A * | 3/1998 | Quadakkers et al. ......... 429/210 |
| 5,772,956 | A * | 6/1998 | Hasegawa et al. ............. 420/40 |
| 5,782,954 | A * | 7/1998 | Luk ............................ 75/252 |
| 5,800,152 | A * | 9/1998 | Taimatu et al. ................ 420/40 |
| 5,803,037 | A * | 9/1998 | Kawamura et al. ....... 123/188.8 |
| 5,989,491 | A | 11/1999 | Isomoto et al. |
| 6,294,131 | B1 * | 9/2001 | Jaffrey ........................ 420/40 |
| 6,316,136 | B1 * | 11/2001 | Batawi ........................ 429/26 |
| 6,447,666 | B1 * | 9/2002 | Szameitat ................... 205/290 |

FOREIGN PATENT DOCUMENTS

| | | |
|---|---|---|
| DE | 196 43 157 C1 | 1/1998 |
| DE | 196 43 156 C1 | 2/1998 |
| EP | 0 578 855 A1 | 1/1994 |
| WO | 98/25316 | 6/1998 |
| WO | 99/25890 | 5/1999 |

\* cited by examiner

*Primary Examiner*—Roy King
*Assistant Examiner*—Christopher Kessler
(74) *Attorney, Agent, or Firm*—Laurence A. Greenberg; Werner H. Stemer; Ralph E. Locher

(57) ABSTRACT

Highly dense shaped parts are produced with a powder metallurgic process. The parts are formed of an alloy that, besides of at least 20 weight % chromium, consists of iron and one or several additional alloy portions that in sum do not amount to more than 10 weight %. The part is produced by pressing and sintering to near final shape a ready-to-press powder where the additional alloy portions are introduced in form of a master-alloy powder. The master-alloy may contain the following variations: the additional alloy portions and the iron portions; or the additional alloy portions, the iron parts, and the chromium portions; or additional alloy portions and the chromium portions.

11 Claims, No Drawings

US 7,390,456 B2

POWDER-METALLURGIC METHOD FOR PRODUCING HIGHLY DENSE SHAPED PARTS

CROSS-REFERENCE TO RELATED APPLICATION

This application is a continuation of copending International Application No. PCT/AT01/00398, filed Dec. 19, 2001, which designated the United States and which was not published in English.

BACKGROUND OF THE INVENTION

Field of the Invention

The invention lies in the metallurgy field and pertains, more specifically, to a powder metallurgic method for the production of highly dense shaped parts of an alloy. The alloy contains, besides a portion of at least 20% by weight chromium, iron and, moreover, one of several additional metallic and/or ceramic alloy portions that, in sum, do not amount to more than 10% by weight.

Pure chromium and alloys with high chromium proportions are, if temperatures are low, extremely brittle. It is therefore very difficult to work them with usual powder metallurgic production methods by pressing and sintering the source powder. Therefore, only products or semi-finished products with simple shaping and low density and strength are manufactured of such materials by pressing and sintering, for example, of plate-shaped sputtering targets that are, if necessary, further thermo-mechanically processed for achieving the desired final density and strength.

Iron powder, if compared to chromium powder, is extremely ductile even at low temperatures and can therefore be pressed without problems. Therefore, chromium alloy powders with a sufficiently high iron portion can usually be pressed fairly well. However, it may again be problematic if, besides the iron portion, there are also other alloy portions in smaller quantities in the alloy powder.

Such alloys, especially those with a chromium content of about 90 to 95 weight % an iron portion of about 9 to 4 weight % and a proportion of yttrium or of other rare earths or their oxides to about 1 weight % are used also for interconnectors of solid oxide fuel cells on the basis of their special thermal coefficients of expansion. In order to achieve a sufficiently homogeneous distribution of the present alloy portions that exist in only small quantities of yttrium or rare earths in the powder mixture, a so-called mechanical alloying of the highly clean source powders in high energy mills, normally attritors, is necessary. According to the current state of the art, such alloys are therefore exclusively produced via mechanical alloying.

In doing so, it is disadvantageous that mechanical alloying again leads to an additional strengthening and modification of the morphology of the powders, a fact that strongly reduces the good pressability of the ready-to-press powder. Therefore, complexly formed, highly dense shaped parts made of mechanically alloyed powders, such as interconnectors of fuel cells, cannot be produced any longer by pressing and sintering in a form near to the final shape.

Therefore, for the production of such parts, firstly it is necessary to manufacture raw parts as simply formed elements with sufficient oversize, or as semi-finished product, by pressing and sintering, thus reaching a maximum density of about 70%. In order to attain the necessary final density for a sufficient mechanical strength, these raw parts must be further deformed by mechanical reshaping, for example, by rolling. The desired final shapes that in case of interconnectors may be, for example, channels and surfaces structured by naps, must then be mechanically and/or electrochemically worked out of these raw parts with high expenditure in money and time.

It is true that, with other powder metallurgic production methods, for example, metal injection molding, it is possible to produce complexly formed shaped parts in a form near to the final shape. However, it is disadvantageous that such methods require high portions of binding agents that cause a shrinkage of the shaped parts during the sintering of about up to 10% and more, a fact that again has a disadvantageous effect on the dimensional stability and the faithfulness regarding the shape of the finished part. Moreover, according to the contemporary state of the art, the technology of the metal injection molding is only limited to small parts.

SUMMARY OF THE INVENTION

It is accordingly an object of the invention to provide powder-metallurgical fabrication method which enables the fabrication of highly dense shaped parts which overcomes the above-mentioned disadvantages of the heretofore-known devices and methods of this general type and which provides for a powder metallurgic method that, in its application, is able to produce in a simple and economical way shaped parts sufficiently dense and near to the final shape of big measures and complex forming, of an alloy that consists, besides of a portion of at least 20 weight % chromium, of iron as well as of one or several additional metallic and/or ceramic alloy portions, with in sum no more than 10 weight %.

With the foregoing and other objects in view there is provided, in accordance with the invention, a powder-metallurgic method, which comprises:

providing a ready-to-press powder defining an alloy having a portion of at least 20 weight % chromium, a portion of iron, and at least one additional alloy portion selected from the group consisting of metallic alloy portions and ceramic alloy portions in an aggregate of no more than 10 weight %;

wherein the additional alloy portions are added into the ready-to-press powder exclusively in form of a master-alloy powder, and the master-alloy powder is a powder mixture selected from the group consisting of:

the additional alloy portions and the iron portion;

the additional alloy portions, the iron portion, and the chromium portion; and the additional alloy portions and the chromium portion; and pressing and sintering the ready-to-press powder to near final shape of a highly dense part formed of an alloy formed of at least 20 weight % chromium, iron, and the at least one additional alloy portion of not more than 10 weight %.

In other words, the objects of the invention are achieved in that the production of the shaped parts takes place by pressing and sintering of a ready-to-press powder near to the final shape, the additional alloy portions exclusively being introduced in form of a master-alloy powder into the ready-to-press powder and the master-alloy alternatively consisting of the additional alloy portions and the iron portions
  or the
additional alloy portions, the iron portions and the chromium portions
  or the
additional alloy portions and the chromium portions.

It is decisive that the additional metallic and/or ceramic alloy portions are exclusively introduced into the ready-topress powder in form of a master-alloy, with one or both remaining alloy portions, a fact by which, on the one hand, an excellent regularity of the distribution of the additional alloy portions in the alloy is reached and, on the other hand, the good pressability of the ready-to-press powder is maintained so that also big shaped parts may be easily produced with a complex shaping. If the iron or chromium portions are not used for the production of the master-alloy, they are added to the ready-to-press powder as elementary powders.

The master-alloy powder is advantageously produced by melting at least one alloy component participating in the master-alloy and by the following spraying of the melt.

The ready-to-press powder can be pressed up to pressing densities of 90% and more and does practically not shrink during sintering. Accordingly, the method according to the invention enables components near to the final shape to be produced practically nearly without any working-over and exactly according to the measure.

It is particularly advantageous if a master-alloy of the additional alloy portions is produced with iron. Iron may melt without problems already at temperatures of about 1500° C. and thus ensures an efficient production of the master-alloy powder.

It is especially advantageous, if the pressing of the powder mixture takes place with pressing rams that have several parts, are coordinated with the geometry of the shaped part and that are provided, at least at the surface that is in contact with the powder, with a wear protection layer. By the subdivision of the pressing rams and the adaptation to the geometry of the shaped part even higher pressure forces can be partially applied to the shaped part and a high densification can be reached in all sections of the shaped part, especially also in sections particularly complexly formed. The hard material layer prevents, even in case of highest pressures, a wear that is too fast of the pressing tool by means of the ready-to-press powder.

In particular, the method may be applied according to the invention also to the production of an interconnector of a fuel cell.

Particularly suitable alloys for such interconnectors are, for example, alloys that are manufactured of a ready-to-press powder with 20 to 30 weight % chromium as well as 70 to 80 weight % of a master-alloy of iron with 0.5 to 0.8 weight % rare earth metals, especially yttrium, or of a ready-to-press powder of 95 weight % chromium and 5 weight % of a master-alloy of iron with 0.5 to 0.8 weight % yttrium. When dealing with interconnectors, it is important that, apart from the necessary, precise embodiment of the complex shaping, also the necessary density of the material is reached which guarantees the gas density required for interconnectors. In many cases, this gas density is reached merely by the application of the method according to the invention.

If the gas density in case of certain alloys is not sufficient, it is advantageous to galvanically apply on the surfaces of the pressed and sintered interconnectors either a chromium layer or to carburize the surfaces by applying a graphitic plate and a following heat treatment at a temperature between 1100° C. and 1300° C. during 12 to 48 hours. By applying these additional method steps, then, a sufficient gas density of the interconnectors is definitely reached.

Other features which are considered as characteristic for the invention are set forth in the appended claims.

Although the invention is described herein as embodied in a powder-metallurgic method for the production of highly dense shaped parts, it is nevertheless not intended to be limited to the exemplary details, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments of the invention.

EXAMPLES

For the fabrication of disk-shaped interconnector halves with flow channels and a finely napped surface with a diameter of 120 mm and a thickness of 2.5 mm there was produced a ready-to-press powder of 95 weight % elementary chromium powder and 5 weight % of a master-alloy powder of iron with 0.8 weight % yttrium. The used grain fractions of the powders were from about 45 μm to 160 μm.

The production of the ready-to-press powder took place by weighing in the individual powders, by adding about 1 weight % of microwax as pressure auxiliary means and by mixing them afterwards for 15 minutes in a tumbling mixer.

The pressing of the ready-to-press powder took place on a matrix press with divided pressing rams that were coordinated with the special form of the interconnector halves, with a ram for the inner ring with a flat surface, a ram for the central surface with a napped surface and a ram for the exterior surface.

By dividing the pressing rams, also the complexly formed surfaces were compacted with a pressure of 7 t/cm² (~10⁵ psi) For the reduction of the ram wear caused by the aggressivity of the chromium powder portions in the ready-to-press powder, the ram surfaces in contact with the powder were coated with hard material layers.

After the pressing, the ejection of the interconnector halves out of the die took place, taking into account the relatively small green solidity of the shaped parts in the ejection process, if compared to that of shaped parts of powders that can be well pressed, for example, steel.

The further densification and strengthening of the interconnector halves took place by sintering in hydrogen at 1,450° C. for 3 hours.

Respectively two of the interconnector halves produced in such a way could be connected without further mechanical working-over by soldering to finished interconnectors.

We claim:

1. A powder-metallurgic method, which comprises:
    providing a ready-to-press powder with grain fractions having a grain size of about 45 μm to about 160 μm and defining an alloy having a portion of at least 20 weight % elementary chromium powder, a master-alloy powder of iron, and at least one additional alloy portion selected from the group consisting of metallic alloy portions and ceramic alloy portions in an aggregate of no more than 10 weight %;
    wherein the additional alloy portions are added into the ready-to-press powder exclusively in form of a master-alloy powder, and the master-alloy powder is a pre-alloyed powder consisting of:
    a pre-alloy with the additional alloy portions and the iron portion; and
    substantially without intermediate mechanical alloying of the ready-to-press powder, pressing the ready-to-press powder in a matrix press to form a pressed powder compact and sintering the pressed powder compact to near final shape of a highly dense part formed of an alloy containing at least 20 weight % chromium, iron, and the at least one additional alloy portion of not more than 10 weight %.

2. The powder-metallurgic method according to claim 1, which comprises pressing the powder mixture with pressing rams having a plurality of parts, wherein the parts are coordinated with a geometry of the shaped part to be produced and provided with a wear protection layer at least at a surface in contact with the powder.

3. The powder-metallurgic method according to claim 1, which comprises pressing the powder to form an interconnector of a fuel cell.

4. The powder-metallurgic method according to claim 1, wherein the ready-to-press powder consists of 95 weight % chromium and 5 weight % of a master-alloy of iron with 0.5 to 0.8 weight % yttrium.

5. The powder-metallurgic method according to claim 1, wherein the ready-to-press powder consists of 20 to 30 weight % chromium and 70 to 80 weight % of a master-alloy of iron with 0.5 to 0.8 weight % rare earth metals.

6. The powder-metallurgic method according to claim 5, which comprises selecting yttrium as the rare earth metal.

7. The powder-metallurgic method according to claim 3, which comprises galvanically applying a chromium layer on surfaces of the pressed and sintered interconnector.

8. The powder-metallurgic method according to claim 3, which comprises carburizing surfaces of the pressed and sintered interconnector by applying a graphitic plate and a following heat treatment at a temperature of between 1100° C. and 1300° C. for 12 to 48 hours.

9. The powder-metallurgic method according to claim 1, wherein the pre-alloyed powder of the master alloy powder is a pre-alloy produced substantially without mechanical alloying.

10. The powder-metallurgic method according to claim 1, wherein the pressing step comprises introducing the ready-to-press powder into a matrix press with pressing rams and dies configured to shape an interconnector of a fuel cell.

11. A powder-metallurgic method, which comprises:
providing a ready-to-press powder with grain fractions having a grain size of about 45 µm to about 160 µm and defining an alloy having a portion of at least 20 weight % chromium, a portion of iron, and at least one additional alloy portion selected from the group consisting of metallic alloy portions and ceramic alloy portions in an aggregate of no more than 10 weight %;
wherein the additional alloy portions are added into the ready-to-press powder exclusively in form of a master-alloy powder, and the master-alloy powder is a pre-alloyed powder selected from the group consisting of:
a pre-alloy with the additional alloy portions and the iron portion;
a pre-alloy with the additional alloy portions, the iron portion, and the chromium portion; and
a pre-alloy with the additional alloy portions and the chromium portion; and
substantially without intermediate mechanical alloying of the ready-to-press powder, pressing the powder mixture with pressing rams having a plurality of parts to form a pressed powder compact, wherein the parts of the pressing rams are coordinated with a geometry of the shaped part to be produced and provided with a wear protection layer at least at a surface in contact with the powder, and sintering the pressed powder compact to near final shape of a highly dense part formed of an alloy containing at least 20 weight % chromium, iron, and the at least one additional alloy portion of not more than 10 weight %.

* * * * *